United States Patent
Urban et al.

(10) Patent No.: US 9,989,980 B1
(45) Date of Patent: Jun. 5, 2018

(54) SYSTEM LEVEL THERMAL MANAGEMENT

(71) Applicant: Amazon Technologies, Inc., Seattle, WA (US)

(72) Inventors: Bradley David Urban, Cupertino, CA (US); Aviv Shoval, Palo Alto, CA (US); Christopher Lorenzo Dunn, Los Gatos, CA (US); Kenneth James Albanowski, Fremont, CA (US); Eduardo Bezerra Valentin, Mountain View, CA (US); Ryan Michael Fleming, San Francisco, CA (US); Manuel Rosendo Arana Manzano, San Jose, CA (US); Christopher John Kraeutle, San Jose, CA (US); David Joseph Derrick, Monte Sereno, CA (US); Robert Norman Olson, Sunnyvale, CA (US); Marcus-Alan Gilbert, Plano, TX (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 326 days.

(21) Appl. No.: 14/828,192

(22) Filed: Aug. 17, 2015

(51) Int. Cl.
   *G06F 1/32*       (2006.01)
   *G05D 23/19*      (2006.01)
   *G05B 15/02*      (2006.01)

(52) U.S. Cl.
   CPC ......... *G05D 23/1917* (2013.01); *G05B 15/02* (2013.01)

(58) Field of Classification Search
   None
   See application file for complete search history.

(56) References Cited

U.S. PATENT DOCUMENTS

| | | | |
|---|---|---|---|
| 2009/0153540 A1* | 6/2009 | Blinzer | G06F 1/3203 345/212 |
| 2013/0120630 A1* | 5/2013 | Kim | H04N 5/23241 348/333.01 |
| 2014/0122087 A1* | 5/2014 | Macho | G10L 17/22 704/275 |
| 2014/0362889 A1* | 12/2014 | Jang | G01K 13/00 374/152 |
| 2015/0057830 A1* | 2/2015 | Slaby | G05D 23/1917 700/300 |
| 2016/0224081 A1* | 8/2016 | Worthington | G06F 1/206 |

* cited by examiner

Primary Examiner — Pual Yanchus, III
(74) Attorney, Agent, or Firm — K&L Gates LLP

(57) ABSTRACT

Various examples are directed to providing thermal management to a computing device. The computing device may receive temperature state data describing a temperature state of the computing device. The temperature state may comprise a first temperature value at a first location at the computing device. The computing device may also receive use state data describing a first use state of the computing device. The first use state may comprise an initial operating condition of a first component of the computing device and an initial operating condition of a second component of the computing device. The computing device may determine that at least one temperature value at the computing device is out-of-range and select a second use state for the computing device. The second use state may comprise at least one of a new operating condition for the first component or a new operating condition of the second component.

20 Claims, 8 Drawing Sheets

SYSTEM LEVEL THERMAL MANAGEMENT

BACKGROUND

Thermal management in modern computing devices is typically performed at the hardware level on a component-by-component basis. Components, such as central processing units (CPUs) and graphics processing units (GPUs), are provided with sensors that detect component temperature and logic that determines when the component is overheated and responds by throttling the performance of the component. For example, if a CPU runs hot, thermal management logic for the CPU may reduce the CPU frequency. Thermal management at the hardware level can prevent devices from overheating and failing. If hardware performance is throttled below the minimum requirements of the software executing on the device, however, the device may crash.

DETAILED DESCRIPTION

In the following description, reference is made to the accompanying drawings, which illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Various examples described herein are directed to systems and methods for system level thermal management of a computing device, such as a digital camera. System level thermal management may include changing the thermal properties of the computing device by modifying a use state of the computing device. The use state of a computing device describes the manner in which the device is using some or all of the hardware components making up the device. For example, the use state of a computing device may comprise a set of values for one or more use state variables. In some examples, the use state variables may be operating conditions of one or more components of the computing device. For example, when the computing device is a camera, the use state variables may include frame rate, resolution, wireless upload rate, battery charge state, etc. Use state may be implemented at a software layer of the device, for example, an operating system or other utility may select and implement the use state for a device. A thermal management utility may execute at the software layer of the computing device, for example, as a stand-alone application and/or as a component or components of the operating system. The thermal management utility may be programmed to monitor a temperature state of the device. When the temperature state indicates one or more out-of-range temperature values at the computing device, the thermal management utility may cause changes to the use state to throttle the computing device and reduce heat generation. Some of the examples described herein show a computing device that is a camera. The system level thermal management described herein, however, may be implemented on any suitable computing device.

Figure 1:
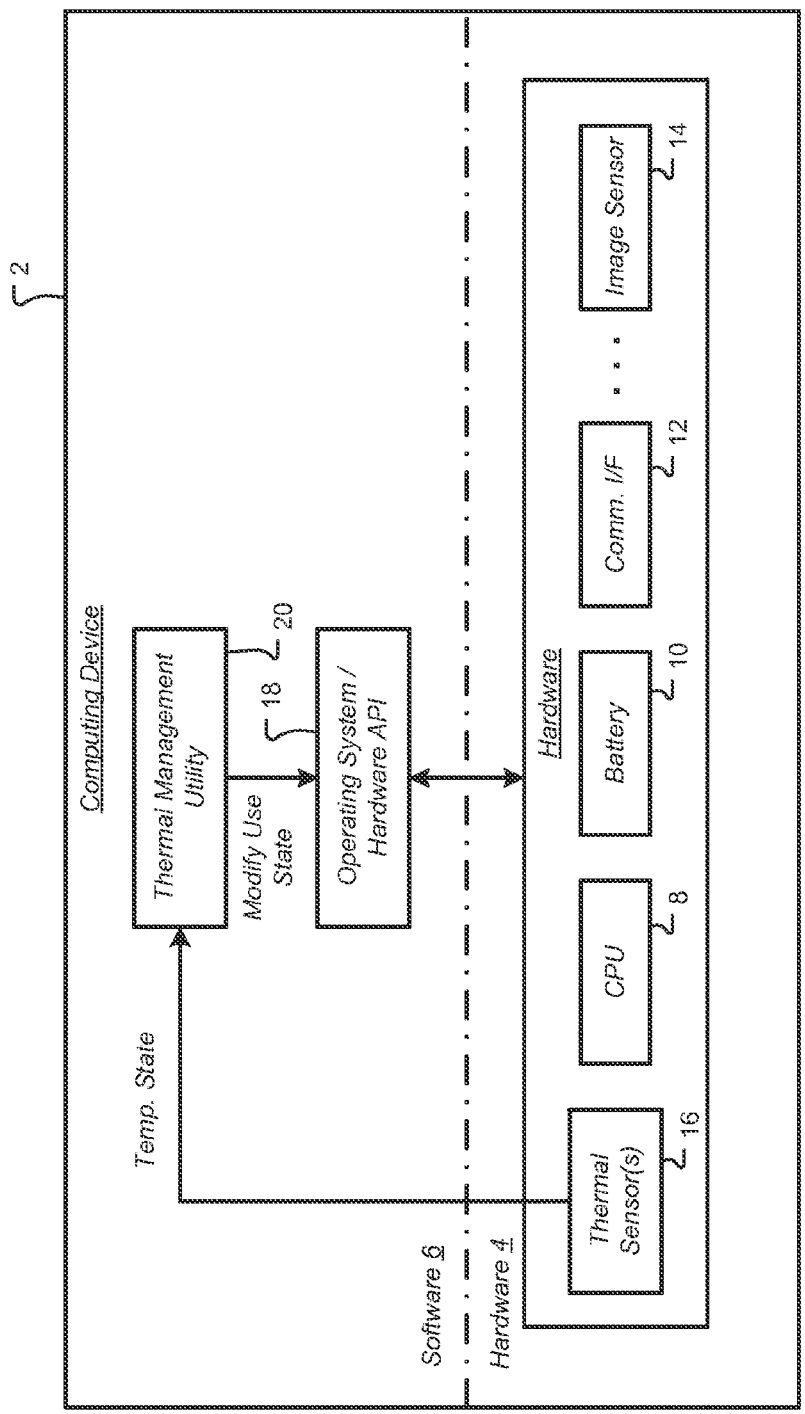
FIG. 1 is a diagram showing one example of an environment for providing system level thermal management for a computing device.

FIG. 1 is a diagram showing one example of an environment 10 for providing system level thermal management for a computing device 2. The computing device 2 may comprise a hardware layer 4 and a system or software layer 6. The hardware layer 4 may comprise various hardware including, for example, a central processing unit (CPU) 8, a battery 10 or other power supply, a communications interface 12, one or more image sensors 14, thermal sensors 16, etc. Different computing devices will include different hardware, and the hardware 8, 12, 14, 16 shown in FIG. 1 should be recognized as just one example. Some hardware components, such as processors, image sensors, etc., may comprise on-board thermal management circuits. For example, on-board thermal management circuits may include processors, sensors, or other suitable hardware for determining that that a temperature value at the hardware component exceeds a threshold level. In response, the on-board thermal management circuit may throttle the performance of the hardware component to reduce the power it consumes and therefore the heat it generates.

The software layer 6 may comprise software components that are executed by the CPU 8 or any other suitable processor component of the computing device 2. For example, the software layer 6 may comprise a hardware Application Programming Interface (API) 18. The hardware API 18 may enable some or all of the other constituents of the software layer 6 to provide instructions to and receive results from the hardware layer 4. In some examples, the hardware API 18 may be an operating system or a component of an operating system of the computing device 2. A thermal management utility 20 may implement system level thermal management for the computing device 2. The thermal management utility 20 may be executed at the computing device 2 in any suitable manner. For example, the thermal management utility 20 may be a stand-alone application. In some examples, the thermal management utility 20 may be a component of an operating system of the computing device 2. In some examples, the thermal management utility 20 may be incorporated into a control utility (not shown) for the computing device 2.

In some examples, the thermal management utility 20 may receive from one or more thermal sensors 16 an indication of a temperature state of the computing device. The temperature state may be received from one or more thermal sensors, for example, via the API 18. The temperature state may indicate a temperature value of at least one location at the computing device 2. In some examples, the temperature state may consist of a single temperature value and in other examples, multiple temperature values may be included. The thermal management utility may determine whether the temperature state indicates one or more out-of-range temperature values. In various examples, the temperature state may indicate an out-of-range temperature value if one temperature value of the temperature state exceeds a value-specific threshold. For example, if a temperature value on an external portion of a device enclosure exceeds a threshold for that temperature value, then the temperature value may be out-of-range. In some examples, the temperature state may indicate an out-of-range temperature value if a combination of temperature values exceeds a combined threshold. For example, the temperature state may indicate an out-of-range temperature value if the average of all temperature values making up the temperature state exceeds a combined threshold. Also, for example, the temperature state may indicate an out-of-range temperature value if the average of a subset of temperature values making up the temperature state exceeds a combined threshold. For example, if the temperature state includes multiple internal temperature values at various locations inside the device, it may indicate an out-of-range temperature value if the average of the internal temperature values exceeds an average internal temperature thresholds. Out-of-range temperature values may be indicated based on any other suitable combination of temperature values making up the temperature state. Additional examples of determining whether a temperature state is out-of-range are provided herein below with reference to the process flow 200 of FIG. 5. In some examples, the temperature state may indicate an out-of-range temperature if a single temperature exceeds a single temperature threshold and an average of all or a subset of the temperatures exceeds an average threshold.

If the temperature state is determined to be out-of-range, then the thermal management utility 20 may modify a use state of the computing device 2 by providing one or more instructions to the API 18, as described herein. In some examples where the temperature state comprises multiple temperature values, the thermal management utility 20 may tailor the use state to affect a specific location within the computing device that has an out-of-range temperature value.

The thermal management utility 20 may modify the use state of the computing device in any suitable manner, such as making adjustments to specific components or operations based on the nature of the out-of-rage temperature state. For example, the thermal management utility 20 may reduce a frame rate and/or resolution of image or video content captured by the image sensor 14. This may reduce the load on the image sensor 14 as it may reduce the frequency at which the image sensor 14 captures data. Reducing the frame rate and/or content resolution may also reduce the load on other components of the computing device 2, such as the CPU 8. For example, a lower frame rate or image resolution leads to a reduction in the number of operations that the CPU 8 must execute to process and encode the captured content. By modifying the use state of the computing device 2 to reduce the load on the device, the thermal management utility 20 may reduce the heat generated by the device 2.

Figure 2:
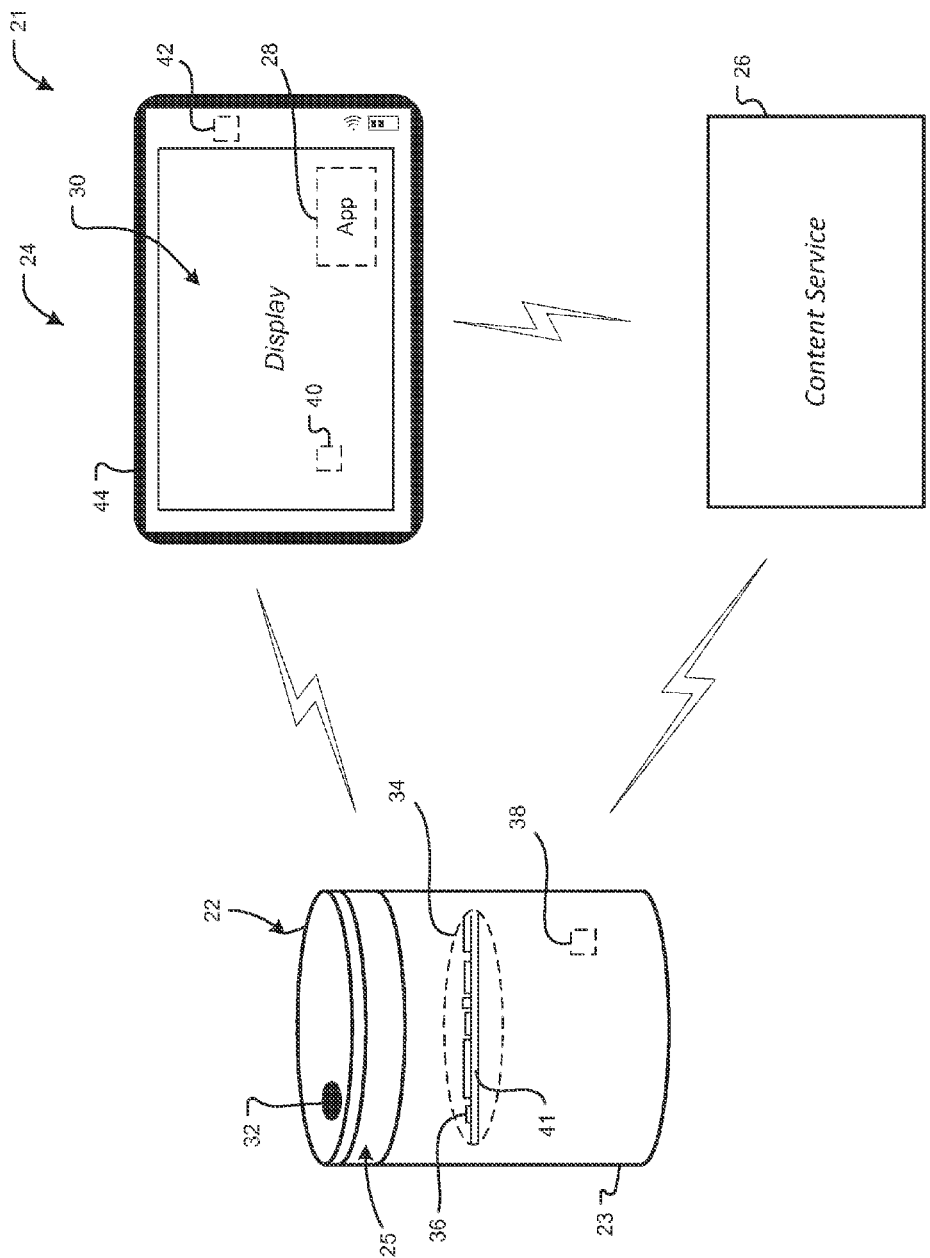
FIG. 2 is a diagram showing one example of an environment comprising example computing devices that may implement system level thermal management.

FIG. 2 is a diagram showing one example of an environment 21 comprising example computing devices 22, 24 that may implement system level thermal management. For example, a camera 22 may be configured to capture content including, for example, images and/or videos. The camera 22 comprises an enclosure 23 with various hardware components located therein. In some examples, the camera 22 is a panoramic camera having a wide-angle or panoramic field-of-view, as described herein. For example, the camera 22 shown in FIG. 2 comprises imaging optics 25 that may be associated with one or more image sensors (not shown). The camera 22 may also comprise one or more thermal sensors 36, 38. Thermal sensors 36, 38 may be to sense temperature values making up the temperature state of the camera 22.

Example thermal sensor 38 is shown at an interior portion of the enclosure 23 located to capture a temperature value for the enclosure 23. (The thermal sensor 38 is shown in dotted form to indicate that it is located at an interior portion of the camera 22 on or near the enclosure 23.) For example, the thermal sensor 38 may capture a surface temperature value of the camera 22 (e.g., a temperature value at a surface of the enclosure 23 that a user is likely to touch). The thermal sensor 38 may be located on the exterior surface of the enclosure 23 and/or may be mounted on an interior of the enclosure 23 that is likely to be at or near the temperature value of the exterior.

Example thermal sensor 36 is located on a printed circuit board (PCB) 41 shown through a cut-away 34 in an enclosure 23. For example, the thermal sensor 36 may capture an internal temperature value as described with respect to FIG. 1. The thermal sensor 36 may be located to sense a temperature value of one or more hardware components of the camera 22 including such as, for example, a processor, a wireless transmitter, etc. In some examples, the thermal sensor 36 may be located to capture a temperature value at or near a component of the camera 22 that can generate large amounts of heat such as, for example, a processor, a battery, a battery charging circuit, wireless transmitter circuit, etc. The camera 22, in some examples, may include additional thermal sensors, fewer thermal sensors, and/or thermal sensors at locations other than those shown in FIG. 2.

In some examples, the camera 22 may lack a display screen or other display. Instead, the camera 22 may capture content and send the captured content to a companion computing device 24. The companion computing device 24 may be a computing device that executes a companion application 28. The companion application 28 may provide a user of the companion computing device 24 with functionality for using the camera 22. For example, the companion application 28 may be configured to receive viewfinder content data from the camera 22. Viewfinder content data may comprise images and/or video captured by the camera 22. The companion application 28 may cause the companion computing device 24 to display viewfinder content data on the display 30 where it can be viewed by a user. This may allow the user to effectively point the camera 22. In some examples, the companion application 28 may also have a playback mode, where content (e.g., videos and/or images) captured by the camera 22 are played back for viewing (e.g., at full resolution) on the display 30.

In some examples, the camera 22 and/or the computing device 24 may be programmed to provide content captured by the camera 22 to a remote content service 26. The remote content service 26 may perform various services relating to the content including, for example, data storage, data summarization, etc. The remote content service 26 may comprise one or more computing devices such as servers, data stores, etc., for example, as described herein below with respect to FIG. 3. The computing device 24 also comprises thermal sensors 40, 42 that may be used to sense a thermal state of the computing device 24 for system level thermal management. Thermal sensors 40, 42 are both shown in dotted form to indicate that they are within an enclosure 44 of the computing device 24. Thermal sensor 40 may be located at an internal portion of the computing device 24 to provide an internal temperature value while thermal sensor 42 may be located to capture a surface temperature value at the enclosure 44 of the computing device 24. As with the camera 22, the computing device 24, in some examples, may include additional thermal sensors, fewer thermal sensors, and/or thermal sensors at locations other than those shown in FIG. 2.

The computing devices 22, 24 may have various use states describing how the computing devices 22, 24 use their respective hardware. A thermal management utility, such as 20, executing at the respective computing devices 22, 24 may modify use states, as described herein, to manage the thermal performance of the devices 22, 24. TABLE 1 below provides a set of example use state variables for the camera 22 and potential values for the use state variables:

TABLE 1

| Use State Variable | Potential Values |
| --- | --- |
| Content Recording Frame Rate | Off, 24 frames per second (fps), 30 fps, 60 fps, 120 fps |
| Content Resolution | Off, 4 megapixels (MP), 6 MP, 8 MP |
| Video Resolution | Off, 720i, 720p, 1080i, 1080p |
| Wireless Upload Rate | Off, 1 Mb/s, 25 Mb/s, 50 Mb/s |
| Viewfinder Upload Rate | Off, 1 Mb/s, 5 Mb/s, 10 Mb/s |
| Battery Charge State | Not charging, Trickle charge, Standard charge, Fast charge |
| Output State | Display lamp off, Display lamp on |

Use states for the camera 22 may include values for some or all of the use state variables. For example, one possible example use state of the camera 22 may be:
   Content Recording Frame Rate=30 fps;
   Content Resolution=8 MP;
   Video Resolution=720p;
   Wireless Upload Rate=50 Mb/s;
   Viewfinder Upload Rate=50 Mb/s;
   Battery Charge State=Not charging; and
   Output State=Display lamp off In various examples, the content recording frame rate may indicate a frame rate at which the camera 22 is capturing video or other content. The content resolution may indicate the resolution of images and/or video content being captured by the camera 22. Video resolution may describe the screen resolution at which video is being captured by the camera 22. The wireless upload rate may indicate the rate at which the camera 22 uploads video or other content to either the computing device 24 or the remote content service 26. In various examples, the wireless upload rate may describe wireless uploads from the camera 22 according to a Wi-Fi or IEEE 801.11 standard. A viewfinder upload rate may indicate the rate at which the camera 22 uploads video or other content to the computing device 24 for use by the companion application 28. In various examples, the viewfinder upload may utilize a direct wireless connection according to a standard such as near field communication (NFC) or Bluetooth™. The battery charge state may indicate whether a battery or other power supply of the camera 22 is charging. In some examples, different charge rates may correspond to different multiples of the current capacity of the battery. For example, the trickle charge may be at ½ C, the standard charge may be at 1 C, etc. The output state of the camera 22 may describe whether an output display lamp 32 or lamps are lit. In some examples, the output display lamp 32 may be lit when the use state of the camera 22 is modified so as to reduce the camera's performance. In this way a user of the camera 22 may be made aware of the change in use state. The potential values for the use state variables in TABLE 1 should be understood as examples. Any other suitable values may be available in various computing devices.

TABLE 2 below provides a set of example use state variables for the computing device 24 and potential values for the use state variables:

TABLE 2

| Use State Variable | Potential Values |
| --- | --- |
| Display backlight brightness | 0-10 |
| Battery Charge State | Not charging, Charging |
| Wireless Upload Rate | Off, 25 Mb/s, 250 Mb/s |

Display backlight brightness may describe the intensity of the backlight for the display 30. For example, one possible example use state of the computing device 24 may be:
   Display backlight brightness=4;
   Battery Charge State=Charging; and
   Wireless Upload Rate=250 Mb/s.

TABLES 1 and 2 provide only examples of use state variables and values that may be used in computing devices such as the camera 22 and the computing device 24. In other examples, more or fewer use state variables may be used and/or the use state variables provided may have more, fewer, and/or different potential values.

Figure 3:
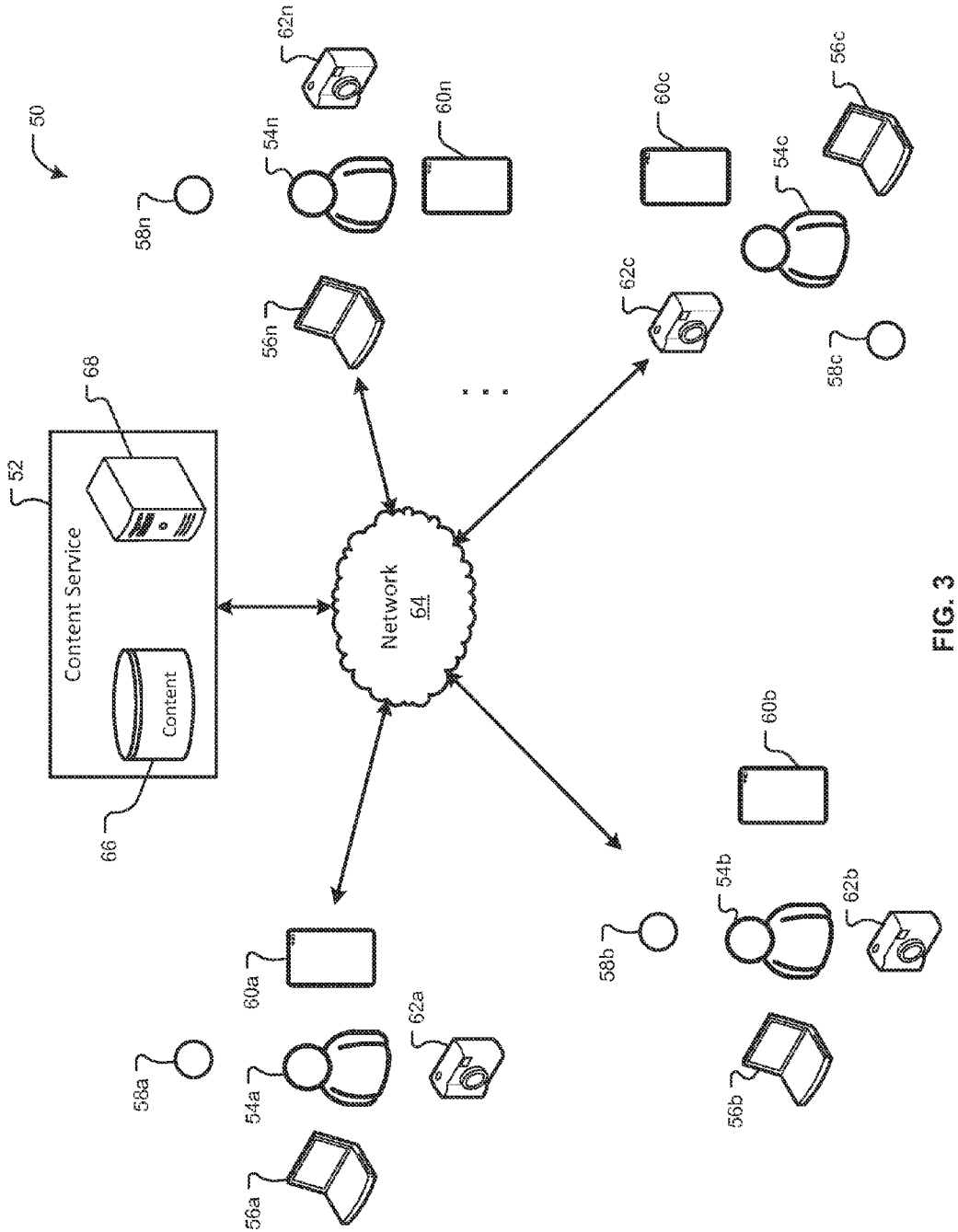
FIG. 3 is a diagram showing another example of an environment including various computing devices that may utilize system level thermal management.

FIG. 3 is a diagram showing another example of an environment 50 including various computing devices that may utilize system level thermal management. The environment 50 comprises a remote content service 52 and users 54a, 54b, 54c, 54n. Each user 54a, 54b, 54c, 54n may use one or more computing devices that may implement system level thermal management, as described herein. The computing devices may include dedicated cameras, such as panoramic cameras 58a, 58b, 58c, 58n and digital cameras 62a, 62b, 62c, 62n as well as other computer devices such as mobile devices 60a, 60b, 60c, 60n, and other computing devices 56a, 56b, 56c, 56n. In some examples, a dedicated camera device 58a, 58b, 58c, 58n, 62a, 62b, 62c, 62n may operate in conjunction with another computing device 60a, 60b, 60c, 60n, 56a, 56b, 56c, 56n in the manner illustrated in FIG. 2. Also, although four users 54a, 54b, 54c, 54n are shown, any suitable number of users 54a, 54b, 54c, 54n may be part of the environment. Although each user 54a, 54b, 54c, 54n shown in FIG. 3 is associated with a panoramic camera 58a, 58b, 58c, 58n, a mobile device 60a, 60b, 60c, 60n, a digital camera 62a, 62b, 62c, 62n and a computing device 56a, 56b, 56c, 56n, some users 54a, 54b, 54c, 54n may use additional computing devices and/or fewer computing devices than what is shown.

The users 54a, 54b, 54c, 54n may utilize computing devices for various different purposes including, for example, to capture content, view content captured on another computing device, transmit content to the remote content service 52, etc. Panoramic cameras 58a, 58b, 58c, 58n may include one or more image sensors and associated optics to capture panoramic panoramic videos. Panoramic cameras 58a, 58b, 58c, 58n may have a panoramic field-of-view larger than that of a standard camera. For example, panoramic cameras 58a, 58b, 58c, 58n may have a field-of-view of about 180° or greater. Some panoramic cameras 58*a*, 58*b*, 58*c*, 58*n* may have fields-of-view as large as 360° and/or 4*n* steradians. In some examples, a panoramic camera 58*a*, 58*b*, 58*c*, 58*n* may comprise a single image sensor with lenses, mirrors or other optics allowing the single image sensor to receive electromagnetic radiation (e.g., light) from the panoramic field-of-view. In some examples, a panoramic camera 58*a*, 58*b*, 58*c*, 58*n* may comprise multiple image sensors (e.g., with overlapping fields-of-view). The panoramic camera 58*a*, 58*b*, 58*c*, 58*n* (or another component of the environment 50) may be configured to stitch frames from the respective image sensors into a single panoramic frame. In some examples, a panoramic camera 58*a*, 58*b*, 58*c*, 58*n* may be configured to communicate with other components of the environment 50 utilizing, for example, a wired or wireless connection. For example, a panoramic camera 58*a*, 58*b*, 58*c*, 58*n* may upload a frame or frames to a mobile device 60*a*, 60*b*, 60*c*, 60*n* or other computing device 56*a*, 56*b*, 56*c*, 56*n* via a wired connection, such as Universal Serial Bus (USB), or wireless connection, such as near field communication (NFC) or Bluetooth™. In some examples, a panoramic camera 58*a*, 58*b*, 58*c*, 58*n* may be configured to upload video directly to a remote content service 52, for example, via the network 64. Also, in some examples, a panoramic camera 58*a*, 58*b*, 58*c*, 58*n* may comprise a processor and/or other components to implement an image processor (e.g., for de-blurring, as described herein).

Digital cameras 62*a*, 62*b*, 62*c*, 62*n* may comprise any suitable device with one or more image sensors to capture an image and/or video. In some examples, digital cameras 62*a*, 62*b*, 62*c*, 62*n* may be configured to communicate with other components of the environment 50 utilizing, for example, a wired or wireless connection. For example, a digital camera 62*a*, 62*b*, 62*c*, 62*n* may upload images and/or videos to a mobile device 60*a*, 60*b*, 60*c*, 60*n* or other computing device 56*a*, 56*b*, 56*c*, 56*n* via a wired connection, such as Universal Serial Bus (USB), or wireless connection, such as near field communication (NFC) or Bluetooth™. In some examples, a digital camera 62*a*, 62*b*, 62*c*, 62*n* may be configured to upload images and/or video directly to a remote content service 52, for example, via the network 64. Digital cameras 62*a*, 62*b*, 62*c*, 62*n* may have a standard or panoramic field-of-view.

A mobile device 60*a*, 60*b*, 60*c*, 60*n* may be any suitable type of computing device comprising a processor and data storage. In some examples, a mobile device 60*a*, 60*b*, 60*c*, 60*n* may be configured to receive content captured by a panoramic camera 58*a*, 58*b*, 58*c*, 58*n* or digital camera 62*a*, 62*b*, 62*c*, 62*n* and transfer the content to the content service 52. Also, in some examples, a mobile device 60*a*, 60*b*, 60*c*, 60*n* may execute a companion application (similar to the companion application 28) and may provide content for display to the user 54*a*, 54*b*, 54*c*, 54*n* showing content captured by a digital camera 62*a*, 62*b*, 62*c*, 62*n* and/or panoramic camera 58*a*, 58*b*, 58*c*, 58*n*. Also, in some examples, a mobile device 60*a*, 60*b*, 60*c*, 60*n* may comprise one or more image sensors and associated optics for capturing content. In some examples, a mobile device 60*a*, 60*b*, 60*c*, 60*n* may be configured to communicate on a cellular or other telephone network in addition or instead of the network 64.

Other computing devices 56*a*, 56*b*, 56*c*, 56*n* may be any suitable type of computing cevice comprising a processor and data storage including, for example, a laptop computer, a desktop computer, etc. In some examples, computing devices 56*a*, 56*b*, 56*c*, 56*n* may be configured to receive content captured by a panoramic camera 58*a*, 58*b*, 58*c*, 58*n* or digital camera 62*a*, 62*b*, 62*c*, 62*n* and transfer the content to the content service 52. Also, in some examples, a computing device 56*a*, 56*b*, 56*c*, 56*n* may execute a companion application (similar to the companion application 28) and may provide content for display to the user 54*a*, 54*b*, 54*c*, 54*n* showing content captured by a digital camera 62*a*, 62*b*, 62*c*, 62*n* and/or panoramic camera 58*a*, 58*b*, 58*c*, 58*n*. Also, in some examples, a computing device 56*a*, 56*b*, 56*c*, 56*n* may comprise one or more image sensors and associated optics for capturing content.

Similar to the remote content service 26, the optional remote content service 52 may perform various services relating to content captured by other computing devices. Example content services may include data storage, data summarization, etc. The remote content service 52 may comprise one or more data stores 66 and one or more servers 68. The data store 66 may store content received from the various computing devices, motion kernels, and/or other data associated with de-blurring. The various components 68, 66 of the remote content service 52 may be at a common geographic location and/or may be distributed across multiple geographic locations. For example, the remote content service 52 may be implemented in whole or in part as a cloud or Software as a Service (SaaS) system. The various components of the environment 50 may be in communication with one another via a network 64. The network 64 may be and/or comprise any suitable wired or wireless network configured according to any suitable architecture or protocol. In some examples, the network 64 may comprise the Internet.

Figure 4:
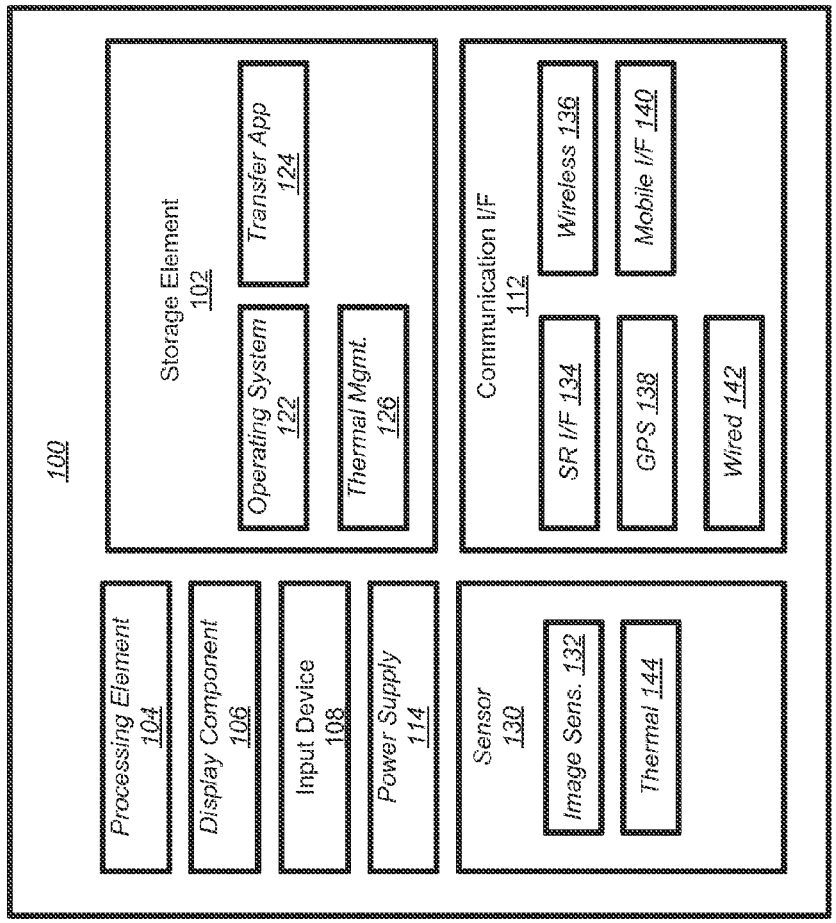
FIG. 4 is a block diagram showing an example architecture of a computing device, such as the panoramic cameras, digital cameras, mobile devices and other computing devices described herein.

FIG. 4 is a block diagram showing an example architecture 100 of a computing device, such as the panoramic cameras, digital cameras, mobile devices and other computing devices described herein. For example, the various components of the architecture 100 may be part of the hardware layer 4 of a computing device, described with respect to FIG. 1. It will be appreciated that not all computing devices will include all of the components of the architecture 100 and some computing devices may include additional components not shown in the architecture 100.

The architecture 100 may include one or more processing elements 104 for executing instructions and retrieving data stored in a storage element 102. The processing element 104 may comprise at least one processor. Any suitable processor or processors may be used. For example, the processing element 104 may comprise one or more digital signal processors (DSPs), one or more central processing units (CPUs), one or more graphical processing units (GPUs), etc. The storage element 102 can include one or more different types of memory, data storage or computer readable storage media devoted to different purposes within the architecture 100. For example, the storage element 102 may comprise flash memory, random access memory, disk-based storage, etc. Different portions of the storage element 102, for example, may be used for program instructions for execution by the processing element 104, storage of images or other digital works, and/or a removable storage for transferring data to other devices, etc.

The storage element 102 may also store software for execution by the processing element 104. When executed, software stored at the storage element 102 may be part of the software layer of the computing device similar to the software layer 6 of the computing device 2 described above. An operating system 122 may provide the user with an interface for operating the computing device and may facilitate communications and commands between applications and utilities executing at the software layer and the various hardware of the architecture 100. For example, the operating system 122 may be and/or include a hardware API, such as the hardware API 18 described herein. A transfer application 124 may be executed by a computing device in communication with a camera, such as a panoramic camera 58a, 58b, 58c, 58n or another digital camera 62a, 62b, 62c, 62n. The transfer application 124 may be configured to receive content from another device (e.g., a panoramic camera or digital camera) or from an image sensor 132 that may be included in the architecture 100. In some examples, the transfer application 124 may also be configured to upload the received videos to the content service 52. A thermal management utility 126 may execute system level thermal management as described herein. In some examples, the thermal management utility 126 may be a component of the operating system 122.

When implemented in some computing devices, the architecture 100 may also comprise a display component 106. The display component 106 may comprise one or more light emitting diodes (LEDs) or other suitable display lamps. For example, referring to the camera 22 described in FIG. 2, the display lamp 32 may be a display component 106. Also, in some examples, the display component 106 may comprise, for example, one or more devices such as cathode ray tubes (CRTs), liquid crystal display (LCD) screens, gas plasma-based flat panel displays, LCD projectors, or other types of display devices, etc. For example, referring to the computing device 24 also described in FIG. 2, the display 30 may also be an example of a display component 106.

In some implementations, the architecture 100 may also include one or more input devices 108 operable to receive inputs from a user. The input devices 108 can include, for example, a push button, touch pad, touch screen, wheel, joystick, keyboard, mouse, trackball, keypad, light gun, game controller, or any other such device or element whereby a user can provide inputs to the architecture 100. These input devices 108 may be incorporated into the architecture 100 or operably coupled to the architecture 100 via wired or wireless interface. When the display component 106 includes a touch sensitive display, the input devices 108 can include a touch sensor that operates in conjunction with the display component 106 to permit users to interact with the image displayed by the display component 106 using touch inputs (e.g., with a finger or stylus). The architecture 100 may also include a power supply 114, such as a wired alternating current (AC) converter, a rechargeable battery operable to be recharged through conventional plug-in approaches, or through other approaches such as capacitive or inductive charging.

The architecture 100 may also include a communication interface 112, comprising one or more wired or wireless components operable to communicate with one or more other computing devices and/or with the remote content service 52. For example, the communication interface 112 may comprise a wireless communication module 136 configured to communicate on a network, such as the network 64, according to any suitable wireless protocol, such as IEEE 802.11 or another suitable wireless local area network WLAN protocol. A short range interface 134 may be configured to communicate using one or more short range wireless protocols such as, for example, near field communications (NFC), Bluetooth™, Bluetooth LE™, etc. A mobile interface 140 may be configured to communicate utilizing a cellular or other mobile protocol. A Global Positioning System (GPS) module 138 may be in communication with one or more earth-orbiting satellites or other suitable position-determining systems to identify a location of the architecture 100. A wired communication module 142 may be configured to communicate according to the Universal Serial Bus (USB) protocol or any other suitable protocol.

The architecture 100 may also include one or more sensors 130 such as, for example, one or more image sensors and one or more thermal sensors 144. An image sensor 132 is shown in FIG. 4. Some examples of the architecture 100 may include multiple image sensors 132. For example, a panoramic camera may comprise multiple image sensors 132 resulting in multiple video frames that may be stitched to form a panoramic output. A thermal sensor 144 is also shown in FIG. 4. Some examples of the architecture 100 may include multiple thermal sensors 144 (e.g., see thermal sensors 36, 38, 40, 42 in FIG. 2). Thermal sensors 144 may be utilized to sense a temperature state of the computing device. The temperature state may be used, as described herein, to perform system level thermal management by modifying the use state of the computing device in response to changes in the temperature state. In some examples, the one or more sensors 130 may include additional sensors not shown in FIG. 4 including, for example, motion sensors such as gyro sensors, accelerometers, etc. Any suitable gyro sensor may be used including, for example, ring laser gyros, fiber-optic gyros, fluid gyros, vibration gyros, etc. Any suitable accelerometer may be used including, for example, a piezoresistive accelerometer, a capacitive accelerometer, etc. In some examples, the GPS interface 138 may be utilized as a motion sensor. For example, changes in the location of the architecture 100, as determined by the GPS interface 138, may indicate the motion of the GPS interface 138.

Figure 5:
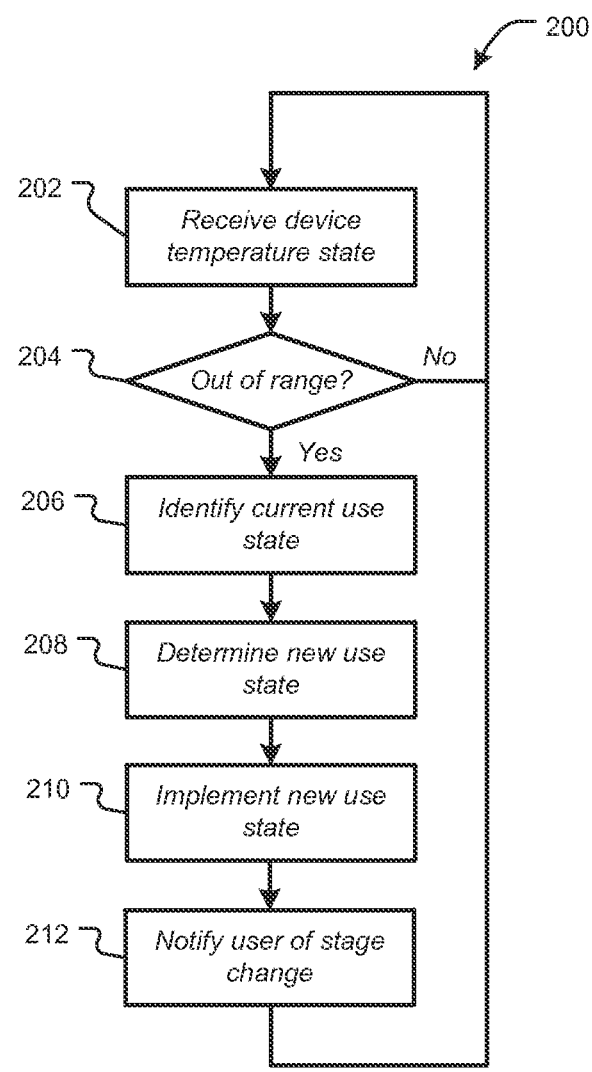
FIG. 5 is a flow chart showing one example of a process flow that may be executed by a thermal management utility to implement system level thermal management of a computing device.

FIG. 5 is a flow chart showing one example of a process flow 200 that may be executed by a thermal management utility to implement system level thermal management of a computing device. At 202, the thermal management utility may receive data describing a temperature state of the computing device. As described herein, the temperature state may include one or more temperature values, for example at different locations on the computing device.

At 204, the thermal management utility may determine whether the temperature state indicates one or more out-of-range temperature values. Any suitable technique may be used to determine whether the temperature state indicates one or more out-of-range temperature values. For example, when the temperature state consists of a single temperature value for the computing device, that temperature value may be out-of-range when it exceeds a threshold temperature value. If the temperature value is at a particular location in the computing device, the threshold temperature value may be referred to as a location temperature value threshold, or a temperature value threshold at the measured location. Additional techniques may be used in examples where the temperature state comprises multiple temperature values, for example, from different locations on the computing device. In some of these examples, the temperature state may indicate an out-of-range temperature value when one of the temperature values exceeds a location-specific threshold. For example, the temperature state may comprise a surface temperature value at a location on an enclosure of the computing device (e.g., a location on the enclosure that comes into contact with a user's skin). Thermal sensors 38 and 42 from FIG. 2 provide examples of sensors that may provide surface temperature values. The temperature state may have an out-of-range temperature value if the surface temperature value exceeds a surface temperature value threshold, sometimes regardless of the other temperature values making up the temperature state. Also, for example, the temperature state may comprise an internal temperature value taken at a location within the enclosure. Thermal sensors 36 and 40 from FIG. 2 provide examples of sensors that may provide internal temperature values. The temperature state may be out-of-range if the internal temperature value exceeds an internal temperature value threshold, sometimes regardless of the other temperature values making up the temperature state.

Also, in some examples where the temperature state includes multiple temperature values, the temperature state may include one or more out-of-range temperature values based on a consideration of some or all of the temperature values together. In some examples, the temperature state may include an out-of-range temperature value or values when all or a subset of the temperature values in the temperature state are close to their location-specific thresholds (e.g., with X %). In some examples, the temperature state may include an out-of-range temperature value when an average of all or a subset of the temperature values exceeds an aggregate threshold. In some examples, the temperature state may include an out-of-range temperature value or values if all temperature values of a common type (e.g., surface, interior, etc.) are close to their location-specific thresholds (e.g., within X %). In some examples, the temperature state may indicate an out-of-range temperature value or values if an average of all temperature value of a common type (e.g., surface, interior, etc.) exceeds an aggregate threshold for that type.

If, at 204, the temperature state does not include any out-of-range temperature values, the thermal management utility may continue to receive a next temperature state of the computing device at 202. If, at 204, the temperature state does include one or more out-of-range temperature values, the thermal management utility may identify a current use state of the computing device at 206. The current use state may be found in any suitable manner. In some examples, the current use state of the computing device may be stored at a memory location of the computing device accessible to the thermal management utility. For example, the thermal management utility may request the current use state from the memory location. Also, in some examples, the thermal management utility may query one or more hardware components (e.g., via a hardware API, such as 18 in FIG. 1) to determine their state and thereby determine the current use state of the computing device.

At 208, the thermal management utility may determine a new use state for the computing device. The new use state may change way that the computing device is used, for example, to reduce power consumption. This may, in turn, reduce the heat generated by the computing device. Additional details describing how the thermal management utility may determine a new use state are provided herein below with respect to FIG. 6. At 210, the thermal management utility may implement the new use state. This may involve, for example, sending instructions directly to computing device hardware (e.g., via a hardware API such as 18 in FIG. 1) that will be used differently according to the new use state or sending instructions to drivers or other software utilities managing the hardware. In some examples, implementing the new use state may comprise requesting the new use state from a control application or utility directing the operation of the computing device.

At 212, the thermal management utility may (optionally) notify the user of the change in use state. For example, when the computing device is out-of-rage because it is too hot, the new use state will often represent a degradation in the performance of the computing device. For example, reducing the frame rate or resolution of video or other content captured by the computing device may cause the computing device to record lower quality content. To notify the user of the change, for example, the thermal management utility may cause the computing device provide an output to the user indicative of the change in use state. For example, the thermal management utility may cause the computing device to illuminate a display lamp, such as the display lamp 32.

Figure 6:
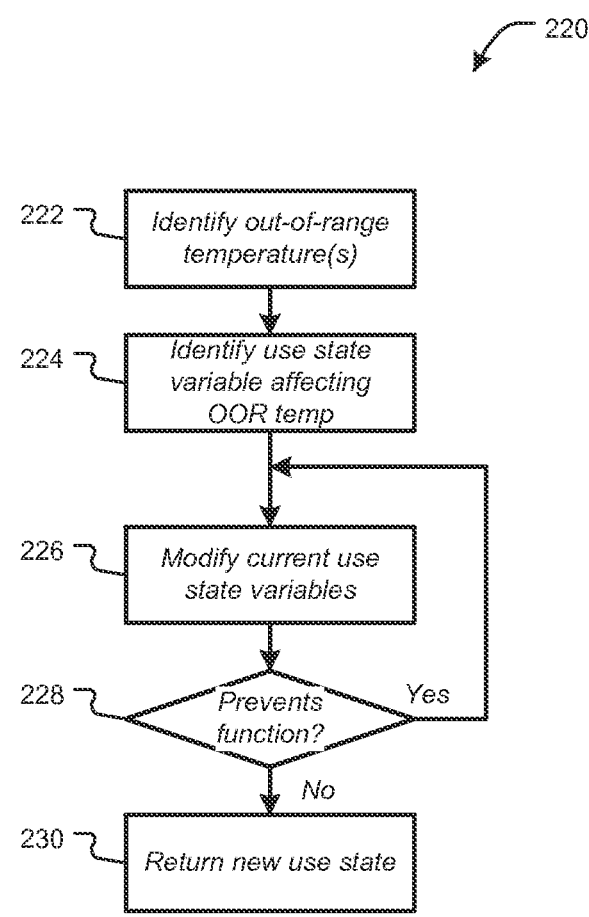
FIG. 6 is a flow chart showing one example of a process flow that may be executed by the thermal management utility to determine a new use state upon determining that the temperature state of the computing device is out-of-range.

FIG. 6 is a flow chart showing one example of a process flow 220 that may be executed by the thermal management utility to determine a new use state upon determining that the temperature state of the computing device includes one or more out-of-range temperature values. For example, the process flow 220 may be executed to implement action 208 of the process flow 200 described with respect to FIG. 5. At 222, the thermal management utility may identify from the temperature state of the computing device one or more temperature values that are out-of-range. A temperature value may be out-of-range if it exceeds a threshold for that temperature value. Also, in some examples, a temperature value may be considered out of range if an aggregation (e.g., average, median, etc.) of temperature values including that temperature value exceed a threshold. For example, if a location temperature value for the computing device exceeds a location-specific threshold, then that location temperature value may be out-of-range. In some examples, if the average or other aggregation the temperature values making up the temperature state exceeds a threshold, then all of the temperature values from the temperature state may be considered out-of-range. Also, for example, if a subset of the temperature values (e.g., surface temperature values, interior temperature values, etc.) collectively exceed a threshold for that subset, then each temperature value in the subset may be considered a out-of-range.

At 224, the thermal management utility may identify at least one use state variable that affects one or more out-of-range temperature values. For example, if a temperature value taken at a location next to a CPU of the computing device is out-of-range temperature, then the thermal management utility may identify use state variables that affect the temperature value of the CPU. These could include, for example, frame rate and resolution. For example, lower frame rates could reduce the processing load on the CPU by reducing the number of frames to be pulled from the image sensor and encoded. Similarly, a lower content resolution may simplify the encoding process, resulting in fewer computations being performed by the CPU. In another example, if a temperature value at a location next to the battery or a battery charging circuit is out-of-range, then the thermal management utility may identify use state variables that affect the temperature value of the battery or battery circuit. For example, ceasing battery charging or reducing the rate of battery charging (if battery charging is occurring) may reduce the heat generated by the battery and/or battery charging circuit.

At 226, the thermal management utility may modify the current value or values for the use state variable or variables identified at 224. For example, the thermal management utility may select modified values for the use state variable or variables that reduce the heat generated by the respective components. This may result in a new use state. Optionally, at 228, the thermal management utility may determine whether the new use state prevents the computing device from executing a desired function, such as a currently executing function. In one example, the computing device is a camera, such as the camera 22, providing content to a companion application 28 executing on a companion computing device, such as 24. If the new use state reduces the viewfinder upload rate to a level where the frame rate at the display 30 is no longer usable (e.g., less than a threshold), then the thermal management utility may determine that the new use state prevents a computing device function. For example, the thermal management utility may calculate an estimated frame rate at the companion computing device at the new use state. In another example, if the new use state reduces the backlight intensity of a computing device below a backlight threshold, then the thermal management utility may determine that the new use state may prevents a computing device function (e.g., the user may not be able to see the display without undue eyestrain). The backlight threshold may be variable, for example, based on a level of ambient light determined, for example, considering an output from an ambient light sensor that may be part of the sensors 130 described above. In yet another example, if the new use state reduces a battery charge rate of the computing device at a time when the current charge of the battery is below a threshold, the thermal management utility may determine that the new use state prevents a computing device function.

If, at 228, the thermal management utility determines that the new use state does not prevent a function, then it may return the new use state at 230. For example, the thermal management utility may use the new use state and proceed to action 210 of the process flow 200 described herein above. On the other hand, if the thermal management utility determines that the new use state does prevent a computing device function, it may return to 226 and make different modifications to the current use case. This may generate a modified new use case that may be tested again at 228.

In some examples, in lieu of executing the process flow 220, the thermal management utility may access a table of correlations between out-of-range temperature values and corresponding new use states. The table, or other similar data structure, may be stored at a memory of the computing. For example, the table may be populated and validated during device testing to ensure that each use state change called for by the table allows the device to remain functional. Use states from the pre-stored table may also be designed and tested to reduce the heat generated locations having temperature values that are out-of-range. For example, if the temperature state indicates that an enclosure surface temperature is out-of-range, the new use state called for by the table may change an operating condition of a component near the location to reduce the heat generated by the component. Also, in some examples, the table may comprise potential new use states with an indication of the power consumed in each use state. The thermal management utility may be programmed to determine a desired reduction in heat generation based on the thermal state. For example, the thermal utility may select a new use state from the potential new states based on a desired reduction in power consumption to bring the one or more out-of-range temperature values below their respective thresholds. For example, if a single temperature value or values are out-of-range by a small amount (e.g., 1-10% over the threshold), then the thermal management utility may select a new use state with a power consumption that is less than that of the current use state by a first amount. If multiple temperature values are out-of-range and/or if a temperature value or values are out-of-range by a larger amount (e.g., greater than 10%), then the thermal management utility may select a new use state with a power consumption that is less than that of the current use state by a second amount that is larger than the first amount.

Figure 7:
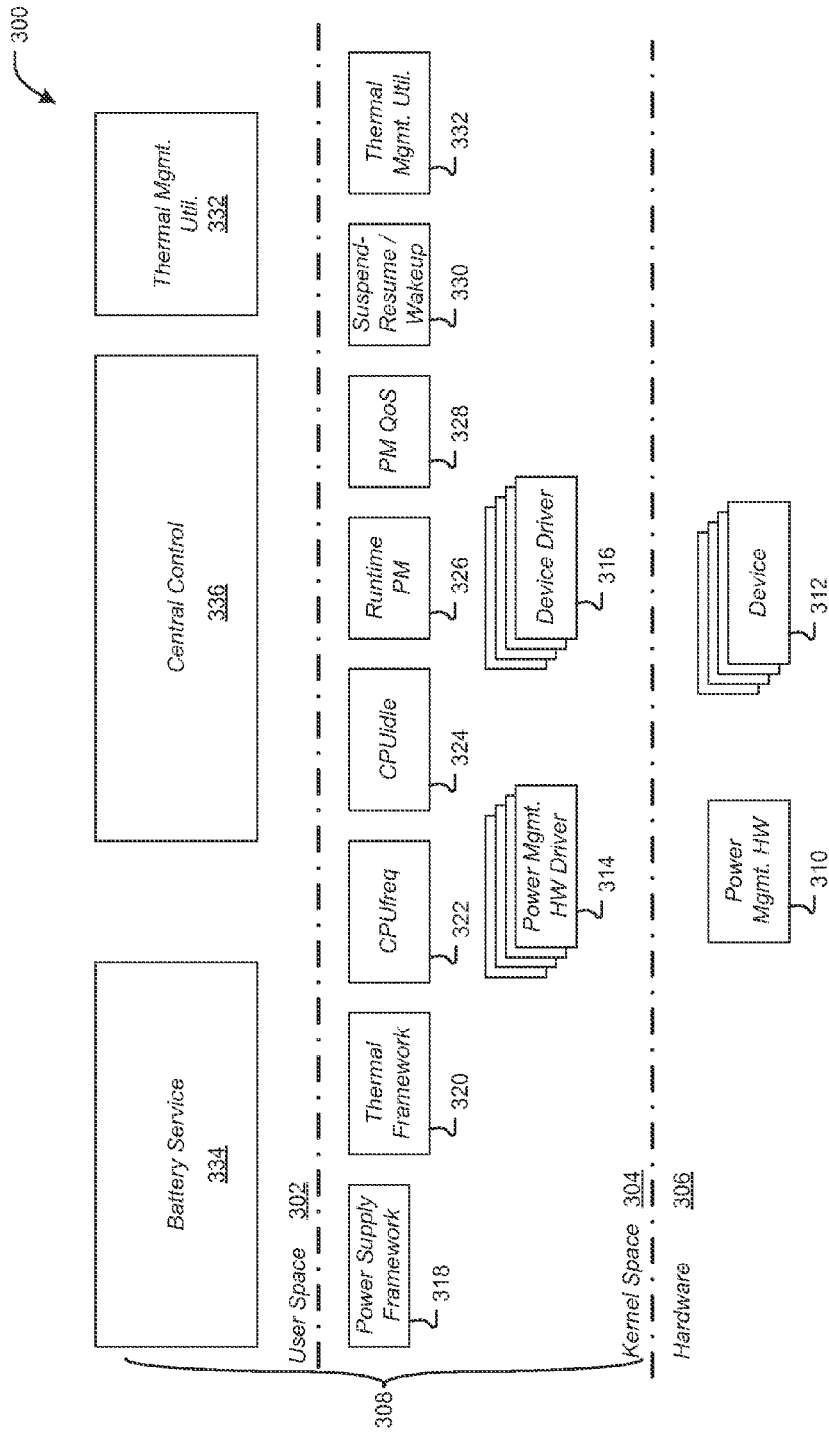
FIG. 7 is a diagram showing one example of a system architecture for a computing device implementing system level thermal management.

FIG. 7 is a diagram showing one example of a system architecture 300 for a computing device implementing system level thermal management. For example, the architecture 300 illustrates example spaces for implementing the thermal management utility described herein. The architecture 300 also illustrates an example where a computing device implements system level thermal management on top of component level thermal management. For example, component level thermal management may be used as a "back-up" that throttles individual components if the system level thermal management fails to keep the temperature value of the individual components with tolerances.

The architecture 300 includes a hardware level 306 and a software level 308. The hardware level 306 comprises power management hardware 310 and devices 312. The power management hardware may include hardware for managing the power provided to the devices 312. Power management hardware 310 may include various different hardware including, for example, a Power Management Integrated Circuit (PMIC), a P-Unit, a Performance Monitoring Unit (PMU) chip, etc. In some examples, different hardware platforms may include different examples of power management hardware 310. Devices 312 may include the various components making up the computing device. For example, all of the components of the architecture 100 described in FIG. 4 may be devices 312.

The software level 308 comprises a kernel space 304 and a user space 302. Kernel space 304 may be differentiated from user space 302 based on resource access. For example, software executing at the kernel space 304 may have direct access to the hardware 306 while software executing at the user space 302 may access hardware through kernel space utilities. For example, kernel space utilities may form all or part of the hardware API 18 described with respect to FIG. 1. A thermal management utility 332 may execute at kernel space 304 and/or at user space 302 (e.g., illustrated as part of a central control application 336). The thermal management utility 332 may have functionality similar to the functionality of the various thermal management utilities described herein.

Kernel space 304, for example, may include drivers 314 and 316. Power management drivers 314 may be drivers for the power management hardware 310 while device drivers 316 may be for devices 312. Kernel space 304 may also comprise thermal management subsystems 318, 320, 322, 324, 326, 328, 330. The thermal management subsystems may implement component level thermal management. For example, component level thermal management may be executed as a fall back. If system level thermal management managed by the thermal management utility fails to prevent excessive temperature, then the component level thermal management subsystems may take steps to throttle individual components by modifying the operating condition or conditions of the component. In some examples, more or fewer or different combinations of thermal management subsystems may be included.

The power supply framework subsystem 318 may comprise one or more utilities for monitoring and throttling the battery or other power supply of the computing device. A fuel gauge utility may monitor a charge state of the battery. A charging IC driver may manage battery charging. For example, the charging IC driver may reduce a charge rate of the IC driver component if its temperature value exceeds a threshold. The thermal framework subsystem 320 may manage and throttle various computing system components including, for example, analog to digital (ADC) components. In some examples, the thermal framework subsystem 320 may also implement a running average power limit. For example, if any component of the computing device exceeds a running average power threshold, the thermal framework subsystem 320 may throttle or shut down that component. In some examples, the thermal framework subsystem 320 may include a core temperature driver that monitors the temperature at the core of the CPU or other processor. A CPU frequency (CPUfreq) subsystem 322 may be configured to modify a clock frequency of the CPU or other processor, for example, when its temperature value exceeds a threshold. A CPU Idle (CPUidle) subsystem 324 may be configured to alternately shut-down the CPU or other processor when there are no tasks for it to perform and re-activate the same when there are tasks to perform. A Runtime Power Management (Runtime PM) subsystem 326 may be configured to suspend and/or resume the operation of one or more of the devices 312 (e.g., via the appropriate device driver 316). A Power Management Quality of Service (PM QoS) subsystem 328 may monitor the performance of various components of the computing device against a set of expected performance parameters. A suspend/resume-wakeup subsystem 330 may be configured to suspect all operations of the computing device (e.g., go to sleep) when the device is not in use for a threshold time.

Referring to the user space 302, the central control application 336 may control the operations of the computing device. For example, the central control application 336 may receive input from a user and modify the operation of the computing device to implement the instructions or other user input. In some examples, the functionality of the thermal management utility 332 may be incorporated into the control application 336. A battery service 334 may allow the user to monitor the status of the battery of the computing device.

Figure 8:
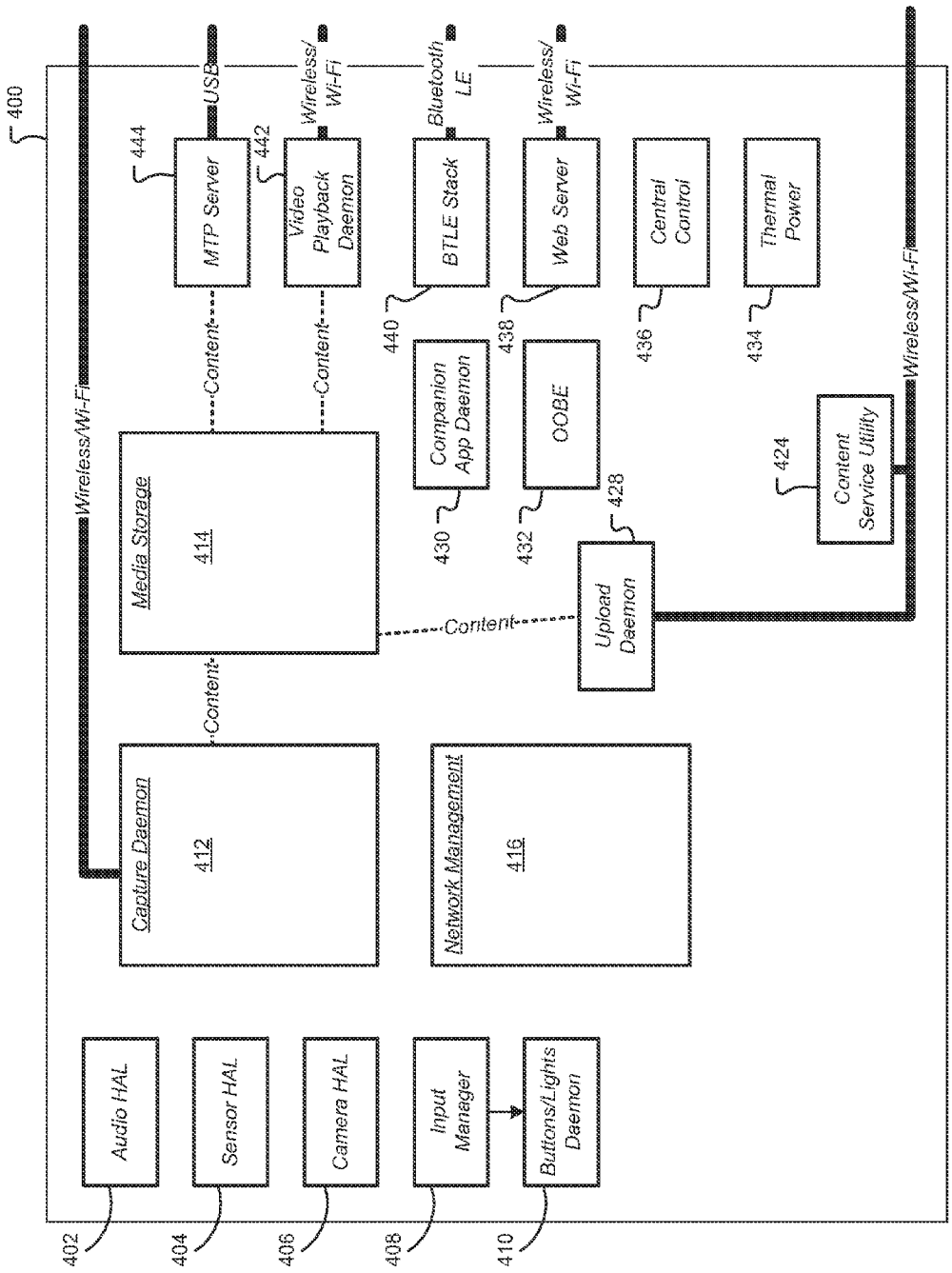
FIG. 8 is a diagram showing one example of a software architecture for a camera for implementing system level thermal management.

FIG. 8 is a diagram showing one example of a software architecture 400 for a camera, such as the camera 22, for implementing system level thermal management. The architecture 400 may be executed at a software layer of the camera 22. A central control utility 436 may generally manage the operation of the architecture 400, for example, in response to user input and/or environment conditions. In some examples, the central control utility 436 may execute the functionality of the thermal management utility described herein. Also, in some examples, a thermal management utility 434 may implement the functionality of the thermal management utilities described herein.

The central control utility 436 may communicate with various hardware components of the architecture 400 via a capture daemon 412. The capture daemon 412 may manage the capture of content by the architecture 400. For example, the capture daemon 412 may be communication with hardware abstraction layers (HALs) 402, 404, 406. HALs may be drivers and/or may be in communication with drivers for components of the architecture 400. An audio HAL 402 may be in communication with a microphone or other audio sensor of the camera. A sensor HAL 404 may be in communication with other sensors of the architecture 400 including, for example, thermal sensors. The camera HAL 406 may be in communication with one or more image sensors of the architecture 400. The capture daemon 412 may provide instructions to the components via the respective HALs 402, 404, 406 and may receive and process outputs from the HALs. For example, the capture daemon 412 may sense and calibrate brightness of image sensors, may handle buffering of incoming video, may perform video encoding, for example, according to the JPEG, H.264 and/or AAC standards, etc. In some examples, the capture daemon 412 may also extract viewfinder content (e.g., to be provided to a companion application such as the companion application 28). In some examples, the capture daemon 412 may communicate directly with wireless transmission hardware to provide viewfinder content to the companion application 28 executing on another computing device, such as the computing device 24. In some examples where the architecture 400 comprises more than one image sensor, the capture daemon 412 may receive frames from multiple image sensors and stitch the frames into a single panoramic frame. Collectively, the capture daemon 412 and HALs 402, 404, 406 may form all or part of the hardware API 18 described at FIG. 1. A network management utility 416 may managed wired and/or wireless network connections for the architecture 400.

The capture daemon 412 may provide content captured through the various HALs 402, 404, 406 to a media storage utility 414. The media storage utility 414 may manage local data storage at the architecture 400 and may also provide the content to other pieces of the architecture 400. For example, the media storage utility 414 may provide captured content to a media transfer protocol (MTP) server utility 444. The MTP server utility 444 may manage transmission of the content to another computing device, for example, according to a Universal Serial Bus (USB) or other suitable wired protocol. In some examples, the media storage utility 414 may also provide content to a video playback daemon 442. The video playback daemon 442 may provide the content to a companion app, such as the application 28, for playback. For example, the video playback daemon 442 may be in communication with wired or wireless transmission hardware for providing content to the companion application 28.

A companion application daemon 430 may manage interactions between the architecture 400 and the companion application 28. For example, the companion application daemon 430 may be in communication with the companion application 28, for example, via the network management utility 416. The companion application daemon 430 may, for example, request that the media storage utility 414 provide content for playback to the video playback daemon 442, as described. In examples where the camera 22 communicates with the computing device 24 utilizing the Bluetooth LE™ standard, the companion application daemon 430 may also be in communication with the companion application 28 via a BTLE stack 440. The central control utility 436 may receive data from various buttons or other input devices and/or provide instructions to output devices (e.g., display lamp 32 in FIG. 2) via an input manager 408. The input manager may be in communication with a Buttons/Lights daemon 410, which may execute as an interface between the input manager 408 and the various input/output devices.

An Out Of Box Experience (OOBE) utility 432 may manage the operation of the architecture 400 during first use. For example, the OOBE utility 432 may be in communication with a content service, such as 26, to receive an initial configuration for the camera 22. In some examples, the content service may be reached utilizing a web server 438. The OOBE utility 432 may also be in communication with content service utilities 424, which may include an authentication function allow a user to log-in and be authenticated to the content service, for example, via a wireless network connection such as Wi-Fi. An upload daemon 428 may receive content from the media storage utility 414 and provide it, via a wireless connection, to the content service.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer readable medium for use by or in connection with an instruction execution system such as a processing component in a computer system. In this sense, the logic may comprise, for example, statements including instructions and declarations that can be fetched from the computer readable medium and executed by the instruction execution system. In the context of the present disclosure, a "computer readable medium" can be any medium that can contain, store, or maintain the logic or application described herein for use by or in connection with the instruction execution system. The computer readable medium can comprise any one of many physical media such as magnetic, optical, or semiconductor media. More specific examples of a suitable computer readable media include, but are not limited to, magnetic tapes, magnetic floppy diskettes, magnetic hard drives, memory cards, solid-state drives, USB flash drives, or optical discs. Also, the computer readable medium may be a random access memory (RAM) including, for example, static random access memory (SRAM) and dynamic random access memory (DRAM), or magnetic random access memory (MRAM). In addition, the computer readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method for managing temperature at a camera, the method comprising:
   receiving, by a processor of the camera, first temperature state data for the camera, wherein the first temperature state data comprises:
      first surface temperature data describing a first surface temperature value of the camera at a first location on a surface of an enclosure of the camera; and
      first internal temperature data including a first internal temperature value of the camera at a second location within the enclosure of the camera;
   receiving, by the processor, first use state data describing a first use state for the camera,
   determining, by the processor, that the first surface temperature value exceeds a surface temperature value threshold or that the first internal temperature value exceeds an internal temperature value threshold;
   selecting, by the processor, a second use state for the camera based on the first temperature state data, wherein the second use state comprises a wireless upload rate used by the camera to transfer content to a computing device; and
   configuring, by the processor, the camera to operate in the second use state;
   determining, by the processor, an estimated frame rate for the wireless upload rate, wherein the estimated frame rate is greater than a threshold frame rate;
   sending the content to the computing device at the wireless upload rate;
   receiving, by the processor of the camera, second temperature state data for the camera while the camera is operating in the second use state, wherein the second temperature state data comprises:
      second surface temperature data describing a second surface temperature value of the camera at the first location on the surface of the enclosure; and
      second internal temperature data including a second internal temperature value of the camera at the second location within the enclosure;
   determining, by the processor, that the second surface temperature value exceeds the surface temperature value threshold or that the second internal temperature value exceeds the internal temperature value threshold; and
   modifying a first operating condition of the processor.

2. The method of claim 1, wherein the second use state comprises a reduced frame rate relative to a first frame rate of the first use state, the method further comprising:
   determining, by the processor, that the first internal temperature value exceeds the internal temperature value threshold, wherein the reduced frame rate is selected to reduce a future internal temperature value of the camera below the internal temperature value threshold.

3. The method of claim 1, further comprising:
   modifying the first operating condition of the processor using a first driver of a kernel space of the camera to control the processor; and
   modifying a second operating condition of an analog to digital (ADC) component using a second driver of the kernel space of the camera to control the ADC component.

4. A first computing device, the first computing device comprising:
    an enclosure;
    a memory located within the enclosure; and
    at least one processor located within the enclosure, wherein the processor is programmed to:
        receive first temperature state data representing a first temperature state of the first computing device, wherein the first temperature state data comprises a first temperature value at a first location at the first computing device;
        receive use state data representing a first use state of the first computing device, wherein the first use state comprises information about an initial operating condition of a first component of the first computing device and information about an initial operating condition of a second component of the first computing device;
        determine that the first temperature value exceeds a first temperature value threshold;
        select a second use state for the first computing device, wherein the second use state comprises at least one of a new operating condition of the first component or a new operating condition of the second component, and wherein the first computing device consumes less power in the second use state than in the first use state and wherein the second use state comprises a wireless upload rate used by the first computing device to transfer content to a second computing device;
        determine an estimated frame rate for the wireless upload rate, wherein the estimated frame rate is greater than a threshold frame rate;
        configure the first computing device to implement the second use state;
        send the content to the second computing device at the wireless upload rate;
        receive second temperature state data representing a second temperature state of the first computing device during operation in the second use state, wherein the second temperature state data comprises a second temperature value at the first location;
        determine that the second temperature value exceeds the first temperature value threshold; and
        modify a first operating condition of the first component of the first computing device.

5. The first computing device of claim 4, wherein the first temperature state also comprises a third temperature value at a second location at the first computing device, and wherein the processor is programmed to, before selecting the second use state for the first computing device, determine that an average of the first temperature value and (ii) the second temperature value exceeds a second temperature value threshold.

6. The first computing device of claim 5, wherein the first location is inside the enclosure and the second location is on an external surface of the enclosure.

7. The first computing device of claim 4, wherein the first temperature state also comprises a third temperature value at a second location at the first computing device, wherein the processor is programmed to determine that the third temperature value exceeds a second temperature value threshold.

8. The first computing device of claim 4, wherein the processor is programmed to select the second use state for the first computing device at a software layer of the first computing device.

9. The first computing device of claim 4, wherein the first temperature state also comprises a third temperature value at a second location at the first computing device, and wherein the processor is further programmed to:
    determine that the third temperature value exceeds a second location temperature value threshold;
    determine that the first component is at the second location; and
    select the new operating condition of the first component, wherein the new operating condition of the first component reduces a power consumed by the first component from an initial power consumed at the initial operating condition.

10. The first computing device of claim 4, wherein the first component is an image sensor, wherein the initial operating condition of the first component is an initial frame capture rate, and wherein the new operating condition of the first component is a new frame capture rate less than the initial frame capture rate.

11. The first computing device of claim 4, wherein the processor is programmed to determine that the first component is at the first location, and wherein the second use state comprises the new operating condition of the first component.

12. The first computing device of claim 4, wherein the processor is further programmed to:
    determine that the first computing device is executing a first function in the first use state; and
    determine that the first computing device can continue to execute the first function in the second use state.

13. The first computing device of claim 4, wherein the processor is further programmed to:
    modify the first operating condition of the first component of the first computing device using a first driver of a kernel space, the first driver being configured to control the first component; and
    modify a second operating condition of the second component of the first computing device using a second driver of the kernel space, the second driver being configured to control the second component.

14. A camera comprising:
    an enclosure;
    at least one thermal sensor;
    an image sensor;
    a wireless communication circuit;
    a memory; and
    at least one processor, wherein the processor is programmed to:
        receive, from the thermal sensor, first temperature state data describing a first temperature state of the camera;
        receive first use state data describing a first use state of the camera, wherein the first use state comprises an initial operating condition of the image sensor and an initial operating condition of the wireless communication circuit, the initial operating condition of the wireless communication circuit comprising a first upload rate at which the camera transfers content to a computing device;
        determine that the first temperature state comprises a first temperature value that is out-of-range;
        determine a frame rate at a second upload rate different from the first upload rate;
        determine that the frame rate is less than a threshold frame rate;
        increase the second upload rate;

select a second use state for the camera, wherein the second use state comprises a new operating condition of the wireless communication circuit comprising the second upload rate at which the camera transfers content to the computing device, and wherein the camera consumes less power in the second use state than in the first use state;

configure the camera to implement the second use state;

receive, from the thermal sensor, second temperature state data describing a second temperature state of the camera operating in the second use state;

determine that the second temperature state comprises a second temperature value that is out-of-range; and in response to the determination that the second temperature value is out-of-range while the camera is operating in the second use state, modify a first operating condition of a first component of the camera.

15. The camera of claim 14, wherein the first temperature state of the camera further comprises an internal temperature value at an internal location inside the enclosure and a surface temperature value at a surface location on a surface of the enclosure, and wherein the processor is programmed to determine that the internal temperature value exceeds an internal temperature value threshold.

16. The camera of claim 14, wherein the first temperature state of the camera further comprises an internal temperature value at an internal location inside the enclosure and a surface temperature value at a surface location on a surface of the enclosure, and wherein the processor is programmed to determine that the surface temperature value exceeds a surface temperature threshold.

17. The camera of claim 16, wherein the processor is approximately at the internal location, and wherein the second use state for the camera further comprises a new operating condition of the image sensor.

18. The camera of claim 14, wherein the processor is programmed to select the second use state for the camera at a software layer of the camera.

19. The camera of claim 14, wherein the first use state comprises a first battery charge state of a battery of the camera, wherein the second use state comprises a second battery charge state of the battery that is less than the first battery charge state, and wherein the processor is further programmed to determine that a current charge of the battery is less than a threshold charge level.

20. The camera of claim 14, wherein the processor is programmed to:

determine that the first temperature value of the first temperature state at a first location of the camera exceeds a first location threshold; and determine that the image sensor is at the first location, and wherein the second use state comprises a new operating condition of the image sensor.

* * * * *